(12) United States Patent
Dayan et al.

(10) Patent No.: US 11,869,047 B2
(45) Date of Patent: Jan. 9, 2024

(54) PROVIDING PURCHASE INTENT PREDICTIONS USING SESSION DATA FOR TARGETING USERS

(71) Applicant: Content Square SAS, Paris (FR)

(72) Inventors: Sharone Dayan, Paris (FR); Mohammad Reza Loghmani, Paris (FR)

(73) Assignee: Content Square SAS, Paris (FR)

( * ) Notice: Subject to any disclaimer, the term of this patent is extended or adjusted under 35 U.S.C. 154(b) by 0 days.

(21) Appl. No.: 17/733,088

(22) Filed: Apr. 29, 2022

(65) Prior Publication Data
US 2023/0196418 A1 Jun. 22, 2023

Related U.S. Application Data

(60) Provisional application No. 63/292,675, filed on Dec. 22, 2021.

(51) Int. Cl.
*G06Q 30/02* (2023.01)
*G06Q 30/0202* (2023.01)
*G06Q 30/0601* (2023.01)
*G06Q 30/0201* (2023.01)

(52) U.S. Cl.
CPC ..... *G06Q 30/0281* (2013.01); *G06Q 30/0201* (2013.01); *G06Q 30/0202* (2013.01); *G06Q 30/0641* (2013.01)

(58) Field of Classification Search
CPC .......... G06Q 30/0281; G06Q 30/0201; G06Q 30/0202; G06Q 30/0641
See application file for complete search history.

(56) References Cited

U.S. PATENT DOCUMENTS

| 8,380,562 B2 * | 2/2013 | Toebes | G06Q 30/02 |
| | | | 705/14.49 |
| 10,162,734 B1 * | 12/2018 | Podgorny | H04L 67/02 |
| 10,979,305 B1 * | 4/2021 | Finci | H04L 41/149 |

(Continued)

OTHER PUBLICATIONS

Diamantaras et al "Predicting Shopping Intent of e-Commerce Users using LSTM Recurrent Neural Networks", Proceedings of the 10th International Conference on Data Science, Technology and Applications (DATA 2021), pp. 252-259, (2021), accessed Aug. 14, 2023 (Year: 2021).*

(Continued)

*Primary Examiner* — Sarah M Monfeldt
*Assistant Examiner* — Andrew Chase Lakhani
(74) *Attorney, Agent, or Firm* — Schwegman Lundberg Woessner, P.A.

(57) ABSTRACT

The subject technology receives session data from a set of users associated with a retail website. The subject technology generates, using at least one machine learning model, a purchase intent prediction based at least in part on the session data. The subject technology determines a set of sessions that correspond to conversions on the retail website based on the session data. The subject technology generates a combination of data using first data from the purchase intent prediction with second data based on the set of sessions that correspond to conversions. The subject technology generates information related to a missed purchase segment based at least in part on the combination of data. The subject technology provides the information for display on a client device.

30 Claims, 8 Drawing Sheets

(56) References Cited

U.S. PATENT DOCUMENTS

| | | | | |
|---|---|---|---|---|
| 2010/0114654 | A1* | 5/2010 | Lukose | G06Q 30/0256 705/14.54 |
| 2011/0060716 | A1* | 3/2011 | Forman | G06F 16/954 706/54 |
| 2013/0136253 | A1* | 5/2013 | Liberman Ben-Ami | H04M 3/5191 379/265.09 |
| 2013/0268468 | A1* | 10/2013 | Vijayaraghavan | G06N 20/00 706/12 |
| 2014/0222503 | A1* | 8/2014 | Vijayaraghavan | G06Q 30/0201 705/7.29 |
| 2018/0144269 | A1* | 5/2018 | Wilson | G06N 5/022 |
| 2018/0293497 | A1* | 10/2018 | Ravindran | G06Q 10/04 |
| 2019/0220893 | A1* | 7/2019 | Mardikar | G06Q 30/0255 |
| 2021/0365981 | A1* | 11/2021 | Janakiraman | G06F 16/215 |

OTHER PUBLICATIONS

"International Application Serial No. PCT/IB2022/062630, International Search Report dated Feb. 23, 2023", 4 pgs.

"International Application Serial No. PCT/IB2022/062630, Written Opinion dated Feb. 23, 2023", 6 pgs.

Hendriksen, Mariya, "Analyzing and Predicting Purchase Intent in E-commerce: Anonymous vs. Identified Customers", Arxiv.Org, Cornell University Library, 201 Olin Library Cornell University Ithaca, NY14853, (Dec. 16, 2020), 10 pgs.

Javier, Fabra, "Log-Based Session Profiling and Online Behavioral Prediction in E-Commerce Websites", IEEE Access, IEEE, USA, vol. 8, (Sep. 17, 2020), 171834-171850.

Tsui, Yin Chun, "A Case Study of Clustering and Visualization With Clickstream Data Using UX2Vec", 2021 The 9th International Conference On Information Technology: IoT And Smart City, Acmpub27, New York, NY, USA, (Dec. 14, 2021), 192-196.

* cited by examiner

PROVIDING PURCHASE INTENT PREDICTIONS USING SESSION DATA FOR TARGETING USERS

This application claims the benefit of priority of U.S. Provisional Patent Application No. 63/292,675, filed Dec. 22, 2021, which is hereby incorporated by reference herein in its entirety for all purposes.

BACKGROUND

The Internet is a collection of disparate computer systems which use a common protocol to communicate with each other. A common use of the Internet is to access World Wide Web (web) pages. Web pages are typically stored on a server and remotely accessed by a client over the Internet using a web browser.

To increase user visitations and revenue, websites have become very sophisticated. websites typically include web pages that provide information to users, advertise products or services to users and/or provide site search functions for users. A problem for website owners is how to determine how successful the website is, for example, whether the informational or other needs of users are met and whether the users are purchasing goods and services advertised on their site.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Embodiments of the subject technology analyze the behavior of anonymous users on a retail website to predict an intention to purchase. In an example, a user is determined to have the intention to purchase if, at any point during the session, the user performs actions that are toward a conversion, irrespective of whether or not the purchase is finalized and how many items are purchased. More precisely, the subject technology utilizes partial or full data of a session, as needed, to predict if the user intended to purchase during that session. Further, the prediction can be combined with the information of which sessions have converted to create the missed purchase segment e.g., users that intended to buy something, but finally did not.

Networked Computing Environment

Figure 1:
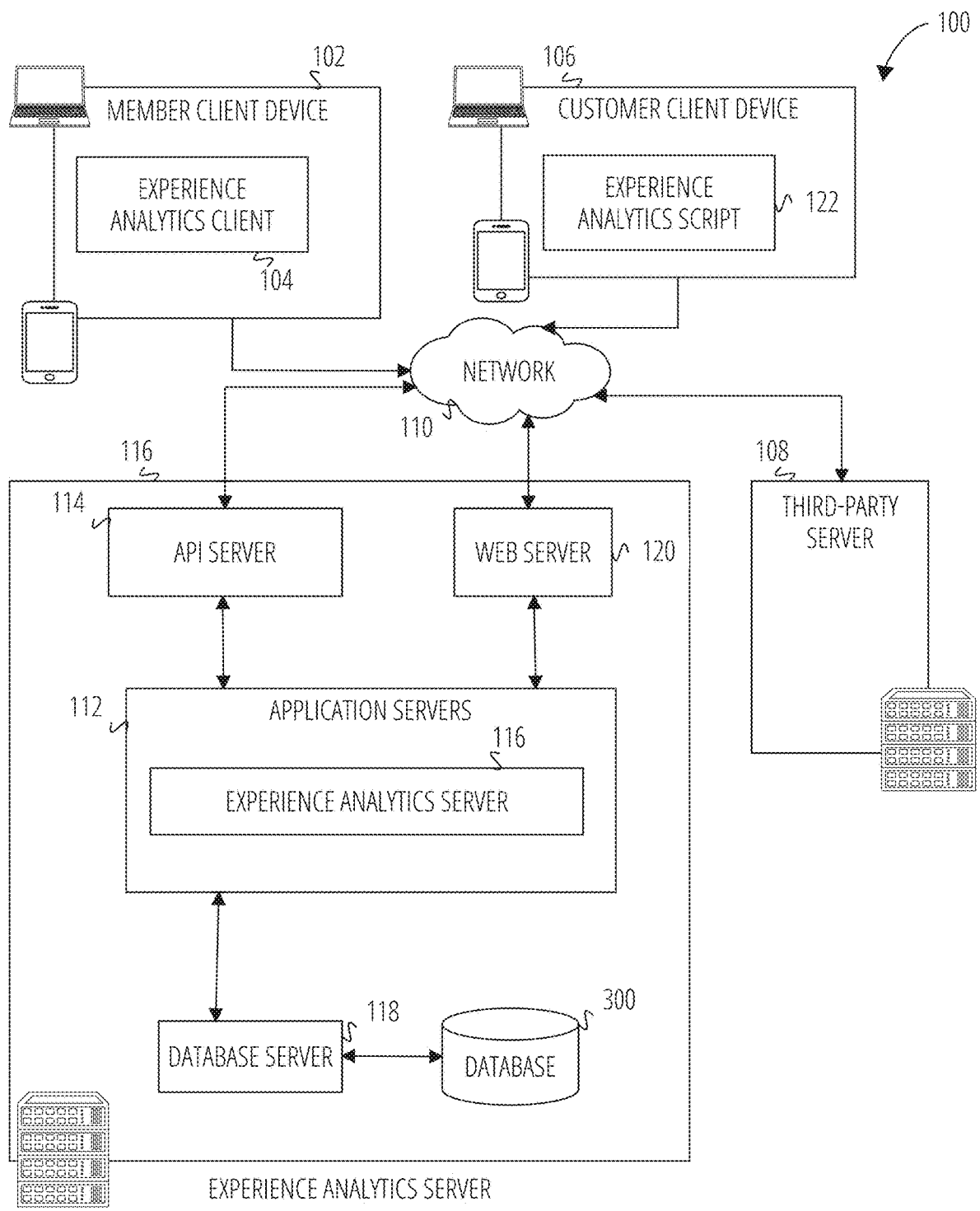
FIG. 1 is a diagrammatic representation of a networked environment in which the present disclosure may be deployed, in accordance with some examples.

FIG. 1 is a block diagram showing an example experience analytics system 100 that analyzes and quantifies the user experience of users navigating a client's website, mobile websites, and applications. The experience analytics system 100 can include multiple instances of a member client device 102, multiple instances of a customer client device 106, and multiple instances of a third-party server 108.

The member client device 102 is associated with a client of the experience analytics system 100 that has a website hosted on by the client's third-party server 108. For example, the client can be a retail store that has an online retail website that is hosted on a third-party server 108. An agent of the client (e.g., a web administrator, an employee, etc.) can be the user of the member client device 102.

Each of the member client devices 102 hosts a number of applications, including an experience analytics client 104. Each experience analytics client 104 is communicatively coupled with an experience analytics server 116 and third-party servers 108 via a network 110 (e.g., the Internet). An experience analytics client 104 can also communicate with locally-hosted applications using Applications Program Interfaces (APIs).

The member client devices 102 and the customer client devices 106 can also host a number of applications including Internet browsing applications (e.g., Chrome, Safari, etc.). The experience analytics client 104 can also be implemented as a platform that is accessed by the member client device 102 via an Internet browsing application or implemented as an extension on the Internet browsing application.

Users of the customer client device 106 can access client's websites that are hosted on the third-party servers 108 via the network 110 using the Internet browsing applications. For example, the users of the customer client device 106 can navigate a client's online retail website to purchase goods or services from the website. While the user of the customer client device 106 is navigating the client's website on an Internet browsing application, the Internet browsing application on the customer client device 106 can also execute a client-side script (e.g., JavaScript (.*js)) such as an experience analytics script 122. In one example, the experience analytics script 122 is hosted on the third-party server 108 with the client's website and processed by the Internet browsing application on the customer client device 106. The experience analytics script 122 can incorporate a scripting language (e.g., a .*js file or a .json file).

In certain examples, a client's native application (e.g., ANDROID™ or IOS™ Application) is downloaded on the customer client device 106. In this example, the client's native application including the experience analytics script 122 is programmed in JavaScript leveraging a Software Development Kit (SDK) provided by the experience analytics server 116. The SDK includes Application Programming Interfaces (APIs) with functions that can be called or invoked by the client's native application.

In one example, the experience analytics script 122 records data including the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, etc. The experience analytics script 122 transmits the data to experience analytics server 116 via the network 110. In another example, the experience analytics script 122 transmits the data to the third-party server 108 and the data can be transmitted from the third-party server 108 to the experience analytics server 116.

An experience analytics client 104 is able to communicate and exchange data with the experience analytics server 116 via the network 110. The data exchanged between the experience analytics client 104 and the experience analytics server 116, includes functions (e.g., commands to invoke functions) as well as payload data (e.g., website data, texts reporting errors, insights, merchandising information, adaptability information, images, graphs providing visualizations of experience analytics, session replay videos, zoning and overlays to be applied on the website, etc.).

The experience analytics server 116 supports various services and operations that are provided to the experience analytics client 104. Such operations include transmitting data to and receiving data from the experience analytics client 104. Data exchanges to and from the experience analytics server 116 are invoked and controlled through functions available via user interfaces (UIs) of the experience analytics client 104.

The experience analytics server 116 provides server-side functionality via the network 110 to a particular experience analytics client 104. While certain functions of the experience analytics system 100 are described herein as being performed by either an experience analytics client 104 or by the experience analytics server 116, the location of certain functionality either within the experience analytics client 104 or the experience analytics server 116 may be a design choice. For example, it may be technically preferable to initially deploy certain technology and functionality within the experience analytics server 116 but to later migrate this technology and functionality to the experience analytics client 104 where a member client device 102 has sufficient processing capacity.

Turning now specifically to the experience analytics server 116, an Application Program Interface (API) server 114 is coupled to, and provides a programmatic interface to, application servers 112. The application servers 112 are communicatively coupled to a database server 118, which facilitates access to a database 300 that stores data associated with experience analytics processed by the application servers 112. Similarly, a web server 120 is coupled to the application servers 112, and provides web-based interfaces to the application servers 112. To this end, the web server 120 processes incoming network requests over the Hypertext Transfer Protocol (HTTP) and several other related protocols.

The Application Program Interface (API) server 114 receives and transmits message data (e.g., commands and message payloads) between the member client device 102 and the application servers 112. Specifically, the Application Program Interface (API) server 114 provides a set of interfaces (e.g., routines and protocols) that can be called or queried by the experience analytics client 104 or the experience analytics script 122 in order to invoke functionality of the application servers 112. The Application Program Interface (API) server 114 exposes to the experience analytics client 104 various functions supported by the application servers 112, including generating information on errors, insights, merchandising information, adaptability information, images, graphs providing visualizations of experience analytics, session replay videos, zoning and overlays to be applied on the website, etc.

The application servers 112 host a number of server applications and subsystems, including for example an experience analytics server 116. The experience analytics server 116 implements a number of data processing technologies and functions, particularly related to the aggregation and other processing of data including the changes in the interface of the website being displayed on the customer client device 106, the elements on the website being displayed or visible on the interface of the customer client device 106, the text inputs by the user into the website, a movement of a mouse (or touchpad) cursor and mouse (or touchpad) clicks on the interface of the website, etc. received from multiple instances of the experience analytics script 122 on customer client devices 106. The experience analytics server 116 implements processing technologies and functions, related to generating user interfaces including information on errors, insights, merchandising information, adaptability information, images, graphs providing visualizations of experience analytics, session replay videos, zoning and overlays to be applied on the website, etc. Other processor and memory intensive processing of data may also be performed server-side by the experience analytics server 116, in view of the hardware requirements for such processing.

System Architecture

Figure 2:
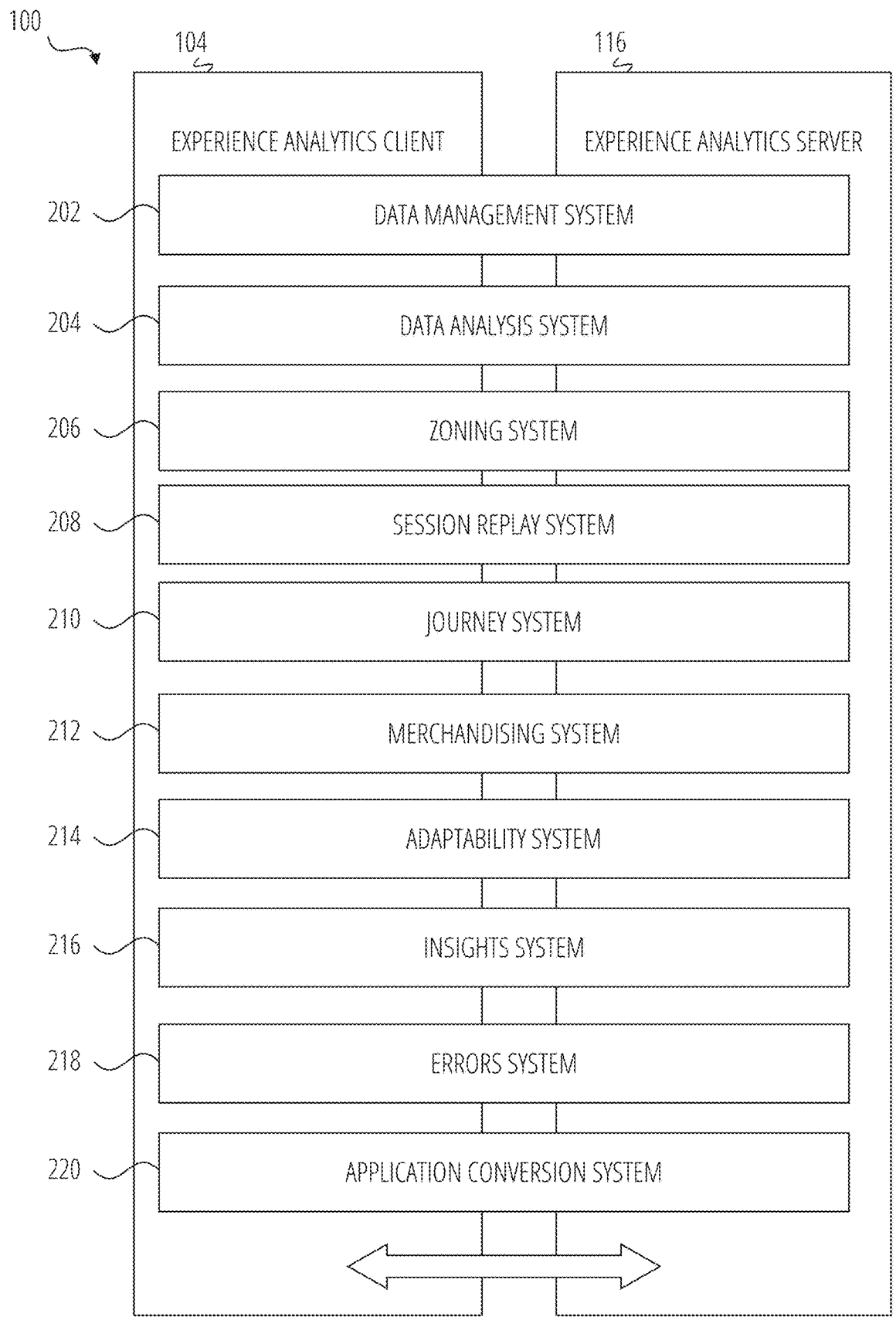
FIG. 2 is a diagrammatic representation of an experience analytics system, in accordance with some examples, that has both client-side and server-side functionality.

FIG. 2 is a block diagram illustrating further details regarding the experience analytics system 100 according to some examples. Specifically, the experience analytics system 100 is shown to comprise the experience analytics client 104 and the experience analytics server 116. The experience analytics system 100 embodies a number of subsystems, which are supported on the client-side by the experience analytics client 104 and on the server-side by the experience analytics server 116. These subsystems include, for example, a data management system 202, a data analysis system 204, a zoning system 206, a session replay system 208, a journey system 210, a merchandising system 212, an adaptability system 214, an insights system 216, an errors system 218, and an application conversion system 220.

The data management system 202 is responsible for receiving functions or data from the member client devices 102, the experience analytics script 122 executed by each of the customer client devices 106, and the third-party servers 108. The data management system 202 is also responsible for exporting data to the member client devices 102 or the third-party servers 108 or between the systems in the experience analytics system 100. The data management system 202 is also configured to manage the third-party integration of the functionalities of experience analytics system 100.

The data analysis system 204 is responsible for analyzing the data received by the data management system 202, generating data tags, performing data science and data engineering processes on the data.

The zoning system 206 is responsible for generating a zoning interface to be displayed by the member client device 102 via the experience analytics client 104. The zoning interface provides a visualization of how the users via the customer client devices 106 interact with each element on the client's website. The zoning interface can also provide an aggregated view of in-page behaviors by the users via the customer client device 106 (e.g., clicks, scrolls, navigation). The zoning interface can also provide a side-by-side view of different versions of the client's website for the client's analysis. For example, the zoning system 206 can identify the zones in a client's website that are associated with a particular element in displayed on the website (e.g., an icon, a text link, etc.). Each zone can be a portion of the website being displayed. The zoning interface can include a view of the client's website. The zoning system 206 can generate an overlay including data pertaining to each of the zones to be overlaid on the view of the client's website. The data in the overlay can include, for example, the number of views or clicks associated with each zone of the client's website within a period of time, which can be established by the user of the member client device 102. In one example, the data can be generated using information from the data analysis system 204.

The session replay system 208 is responsible for generating the session replay interface to be displayed by the member client device 102 via the experience analytics client 104. The session replay interface includes a session replay that is a video reconstructing an individual visitor session on the client's website. For example, a user visiting the client's website on a customer client device 106 can be reconstructed from the data received from the user's experience analytics script 122 on customer client devices 106. The session replay interface can also include the session replays of a number of different visitor sessions to the client's website within a period of time (e.g., a week, a month, a quarter, etc.). The session replay interface allows the client via the member client device 102 to select and view each of the session replays. In one example, the session replay interface can also include an identification of events (e.g., failed conversion, angry customers, errors in the website, recommendations or insights) that are displayed and allow the user to navigate to the part in the session replay corresponding to the events such that the client can view and analyze the event.

The journey system 210 is responsible for generating the journey interface to be displayed by the member client device 102 via the experience analytics client 104. The journey interface includes a visualization of how the visitors progress through the client's website, page-by-page, from entry onto the website to the exit (e.g., in a session). The journey interface can include a visualization that provides a customer journey mapping (e.g., sunburst visualization). This visualization aggregates the data from all of the visitors (e.g., users on different customer client devices 106) to the website, and illustrates the visited pages and in order in which the pages were visited. The client viewing the journey interface on the member client device 102 can identify anomalies such as looping behaviors and unexpected drop-offs. The client viewing the journey interface can also assess the reverse journeys (e.g., pages visitors viewed before arriving at a particular page). The journey interface also allows the client to select a specific segment of the visitors to be displayed in the visualization of the customer journey.

The merchandising system 212 is responsible for generating the merchandising interface to be displayed by the member client device 102 via the experience analytics client 104. The merchandising interface includes merchandising analysis that provides the client with analytics on: the merchandise to be promoted on the website, optimization of sales performance, the items in the client's product catalog on a granular level, competitor pricing, etc. The merchandising interface can, for example, comprise graphical data visualization pertaining to product opportunities, category, brand performance, etc. For instance, the merchandising interface can include the analytics on a conversions (e.g., sales, revenue) associated with a placement or zone in the client website.

The adaptability system 214 is responsible for creating accessible digital experiences for the client's website to be displayed by the customer client devices 106 for users' that would benefit from an accessibility-enhanced version of the client's website. For instance, the adaptability system 214 can improve the digital experience for users with disabilities, such as visual impairments, cognitive disorders, dyslexia, and age-related needs. The adaptability system 214 can analyze the data from the experience analytics script 122 to determine whether an accessibility-enhanced version of the client's website is needed and generates the accessibility-enhanced version of the client's website to be displayed by the customer client device 106.

The insights system 216 is responsible for analyzing the data from the data management system 202 and the data analysis system 204 surface insights that include opportunities as well as issues that are related to the client's website. The insights can also include alerts that notify the client of deviations from a client's normal business metrics. The insights can be displayed by the member client devices 102 via the experience analytics client 104 on within a dashboard of a user interface, as a pop-up element, as a separate panel, etc. In this example, the insights system 216 is responsible for generating an insights interface to be displayed by the member client device 102 via the experience analytics client 104. In another example, the insights can be incorporated in another interface such as the zoning interface, the session replay, the journey interface, or merchandising interface to be displayed by the member client device 102.

The errors system 218 is responsible for analyzing the data from the data management system 202 and the data analysis system 204 to identify errors that are affecting the visitors to the client's website and the impact of the errors on the client's business (e.g., revenue loss). The errors can include the location within the user journey in the website and the page that causes frustration to the users (e.g., users on customer client devices 106 visiting the client's website). The errors can also include causes of looping behaviors by the users, in-page issues such as unresponsive call to actions and slow loading pages, etc. The errors can be displayed by the member client devices 102 via the experience analytics client 104 on within a dashboard of a user interface, as a pop-up element, as a separate panel, etc. In this example, the errors system 218 is responsible for generating an errors interface to be displayed by the member client device 102 via the experience analytics client 104. In another example, the insights can be incorporated in another interface such as the zoning interface, the session replay, the journey interface, or merchandising interface to be displayed by the member client device 102.

The application conversion system 220 is responsible for the conversion of the functionalities of the experience analytics server 116 as provided to a client's website to a client's native mobile applications. For instance, the application conversion system 220 generates the mobile application version of the zoning interface, the session replay, the journey interface, merchandising interface, insights interface, and errors interface to be displayed by the member client device 102 via the experience analytics client 104. The application conversion system 220 generates an accessibility-enhanced version of the client's mobile application to be displayed by the customer client devices 106.

In an embodiment, the insights system 216 analyzes the behavior of users on a retail website to predict the intention to purchase. In an example, such users can be anonymous users. As referred to herein, the term "anonymous" indicates that, although user activity is analyzed by the insights system 216, any personally identifiable information (PII) is not accessed or utilized. In an example, a user is indicated to have the intention to purchase if, at any point during the session, the user acts towards a conversion, irrespective of whether or not the purchase is finalized and how many items are purchased. The insights system 216 utilizes, in an example, a machine learning model(s) (among different types of techniques) to generate prediction of an intention to purchase.

In an embodiment, the insights system 216 enables determining a post-session missed purchase segmentation. In an example, partial or full data of a session can be utilized to predict if the user intended to purchase during that session. Moreover, a prediction can be determined and combined with the information of which sessions have converted to create the "missed purchase segment": e.g., users that intended to buy something, but finally did not purchase by the end of the session.

By providing the missed purchase segment, clients of the subject system (e.g., customer client device 106) can be empowered to understand what goes wrong when a user that has the intention to purchase does not convert. In one example, such discoveries can enable targeted action to improve the conversion rate. Further, the subject technology can enable real-time purchase intent predictions in some implementations. This information can be utilized to take timely actions, such as pushing promotion codes to users at risk of leaving the platform without a purchase.

In an embodiment, the insights system 216 can utilize historical navigation data of a particular user to improve the capabilities of the machine learning model to predict whether the user will purchase by the end of a session (e.g., purchase intent prediction). It is also appreciated that data from anonymous users can be utilized by the machine learning model to generate a purchase intent prediction.

In an embodiment, the insights system 216 has an objective to push targeted actions only to users that actually want to buy something to increase the conversion rate.

In an embodiment, the insights system 216 focuses on generalizing an approach to data from different clients.

As discussed further below in FIG. 4, the insights system 216 can utilize various machine learning models to perform the aforementioned operations to predict various user segments in the subject system, particularly to generate different user segmentations corresponding to a first group of users for non-buyers and a second group of users for buyers. Within these two groups, the insights system 216 can predict a third group of users corresponding to a purchase intent segment, and a fourth group of users corresponding to a missed purchase segment.

Data Architecture

Figure 3:
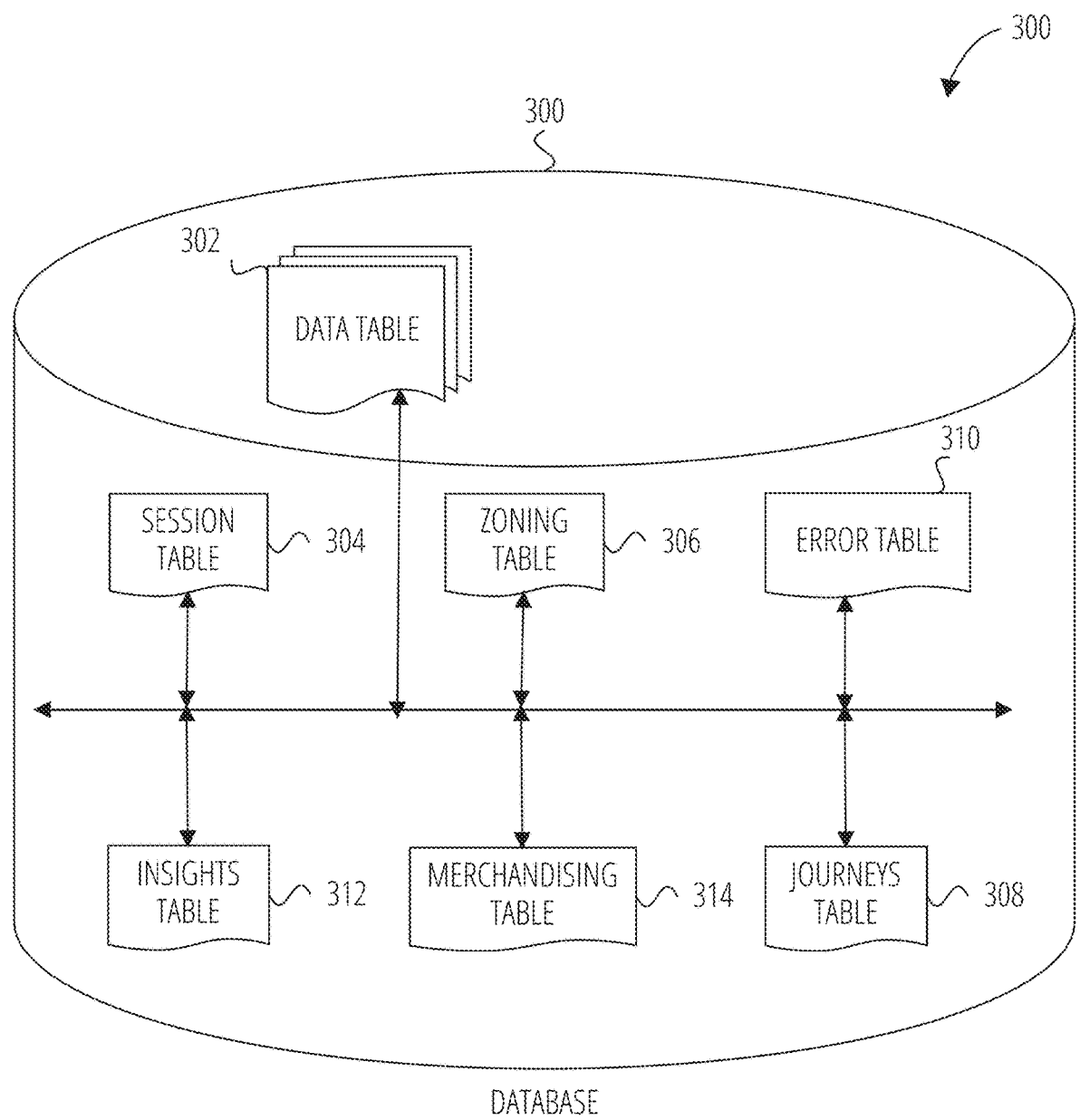
FIG. 3 is a diagrammatic representation of a data structure as maintained in a database, in accordance with some examples.

FIG. 3 is a schematic diagram illustrating database 300, which may be stored in the database 300 of the experience analytics server 116, according to certain examples. While the content of the database 300 is shown to comprise a number of tables, it will be appreciated that the data could be stored in other types of data structures (e.g., as an object-oriented database).

The database 300 includes a data table 302, a session table 304, a zoning table 306, an error table 310, an insights table 312, a merchandising table 314, and a journeys table 308.

The data table 302 stores data regarding the websites and native applications associated with the clients of the experience analytics system 100. The data table 302 can store information on the contents of the website or the native application, the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, etc. The data table 302 can also store data tags and results of data science and data engineering processes on the data. The data table 302 can also store information such as the font, the images, the videos, the native scripts in the website or applications, etc.

The session table 304 stores session replays for each of the client's websites and native applications, or can include information related to sessions on client's websites including features for generating a purchase intent prediction as discussed above in FIG. 2. In this regard, in embodiments, the session table 304 includes data corresponding to features that can be utilized by a machine learning model to provide a purchase intent prediction. Such features can include data corresponding to a user agent, a session, a page, and an interaction. For example, features for the user agent include data for a browser name, browser version, operating system name, operating system version, device, country, and language. For example, features for the session include data for a date, duration of the session, number of visited pages, and visited products. For example, features for the page include data for a page category (reference mapping), time spent on the page, potential product appearing in the page, and scroll rate. For example, features for the interaction include data for a product added to cart, product purchased, revenue generated, click on product, and hover over product. Examples of such features are discussed in more detail in FIG. 5 further below.

The zoning table 306 stores data related to the zoning for each of the client's websites and native applications including the zones to be created and the zoning overlay associated with the websites and native applications.

The journeys table 308 stores data related to the journey of each visitor to the client's website or through the native application.

The error table 310 stores data related to the errors generated by the errors system 218 and the insights table 312 stores data related to the insights generated by the insights table 312.

The merchandising table 314 stores data associated with the merchandising system 212. For example, the data in the merchandising table 314 can include the product catalog for each of the clients, information on the competitors of each of the clients, the data associated with the products on the websites and applications, the analytics on the product opportunities and the performance of the products based on the zones in the website or application, etc.

Embodiments of the subject system can focus on websites and clients (e.g., users) where such clients are visiting websites that are retail oriented (e.g., selling items, products, or services for purchase). Moreover, the subject system, in some embodiments, does not differentiate between single item and multi-item purchases to determine whether a user will purchase an item(s) irrespective of which item(s) and enable a broader identification of such users. The insights system 216 analyzes activity from anonymous users, which may include historical session data as discussed further herein.

Figure 4:
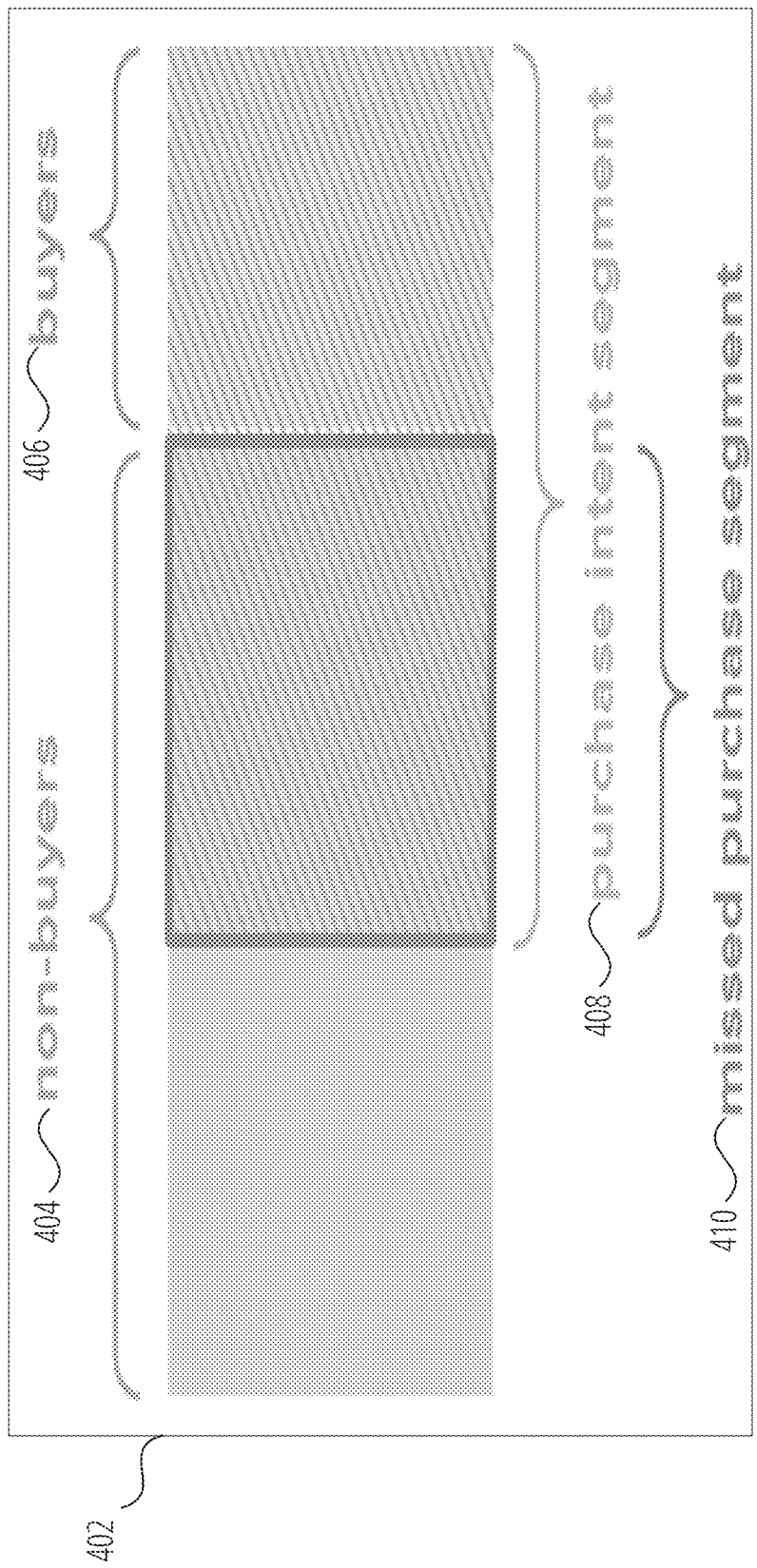
FIG. 4 is a diagram illustrating an example of a segmentation of users as predicted by modeling techniques, according to embodiments of the subject technology.

FIG. 4 is a diagram illustrating an example of a segmentation of users 402 as predicted by modeling techniques, according to embodiments of the subject technology. In the example of FIG. 4, as mentioned before, the insights system 216 can utilize machine learning model(s) to determine the segmentation of users 402 as discussed below.

In FIG. 4, the insights system 216 can utilize partial or an entirety of data from a session to predict if a user intended to purchase during the session. In an embodiment, the insights system 216 can combine the prediction with information of which sessions have converted to generate a missed purchase segment that includes a group of users that intended to purchase one or multiple items or products but did not prior to the end of the session.

As illustrated, the segmentation of users 402 includes two main groups of users corresponding to a group of non-buyers 404 and a group of buyers 406. Within these groups, a purchase intent segment 408 can be identified, which in this example, corresponds to a set of users that are from the group of non-buyers 404 and the group of buyers 406. As further shown, a missed purchase segment 410 is identified from a subset of users from the purchase intent segment 408.

With respect to machine learning modeling, assuming that there are no direct labels on purchase intent, the insights system 216 utilizes information indicating whether (or not) a session has ended in a conversion as a proxy label. In an implementation, to predict the user's purchase intent, the insights system 216 relies on the following assumption: for all sessions that end in a conversion (e.g., when a user completes a purchase on a given website), the user has, at some point during the session, the intention to purchase, and if a model is trained to learn the distribution of sessions that have ended with a conversion, this model considers non-converted sessions closer to the distribution of converted ones if there was a purchase intention.

In embodiments, the insights system 216, for training the aforementioned model, utilizes training data that includes information related to the following:
- user agent: features related to the user context
- session: global session-level features
- page: global page-level features
- interaction: features related to actions taken by the user on the platform A discussion of data that are utilized by the model follows below.

Figure 5:
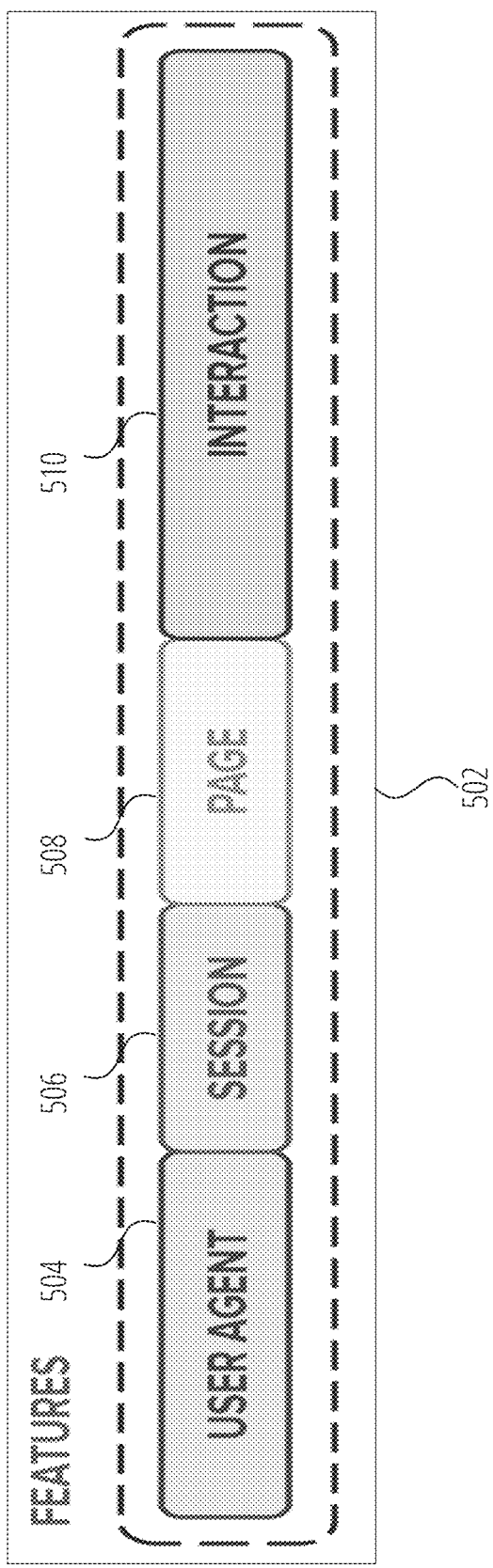
FIG. 5 illustrates examples of fields of data that correspond to features that are utilized by a machine learning model(s) to generate a prediction of purchase intent, in accordance with some embodiments of the subject technology.

FIG. 5 illustrates examples of fields of data that correspond to features (e.g., information) that are utilized by a machine learning model(s) to generate a prediction of purchase intent, in accordance with some embodiments of the subject technology.

As illustrated, a set of features 502 includes a user agent field 504, session field 506, page field 508, and interaction field 510.

In an embodiment, user agent field 504 includes data corresponding to browser name and version, operating system name and version, device, country, and language. In an embodiment, session field 506 includes data corresponding to a date (starting or ending of a session), duration of a session, number of visited pages, and visited products. In an embodiment, page field 508 includes data corresponding to page category, time spent on the page, potential product appearing in the page, and scroll rate. In an embodiment, interaction field 510 includes data corresponding to product(s) added to cart, product(s) purchased, revenue generated, clicking on product(s), and hovering over product(s).

In an embodiment, a machine learning approach utilizes a 1-class classification (e.g., classifying into one class) that solely gains insights from converted sessions (e.g., sessions that end with a conversion), and models their behavior to spot similarities within the non-converted sessions.

In an implementation, the 1-class classification model assumes that for all sessions that end in conversion, the user, at some point during the session, has the intention to purchase. When training a model to learn the distribution of sessions that have ended with a conversion, this model will consider non-converted sessions closer to the distribution of converted ones if there was a purchase intention.

More specifically, insights system 216 utilizes information of whether or not a session has ended in a conversion as a proxy label for purchase intent. Insights system 216 trains a classifier in an unsupervised way using only the sessions that end in a purchase: the model is trained to model the distribution of the sessions that end with a conversion. In an example, the output will be the probability that a sample belongs to the converted segment or an equivalent proxy.

Further, insights system 216 performs a prediction with new samples in the following manner: if the new samples (e.g., sessions) do not end with a purchase, but the model gives a high probability, then the model determines that these new samples correspond to a missed opportunity segment (e.g., missed purchase segment 410).

The following discussion relates to a process that is performed by insights systems 216 to determine the missed purchase segment 410 in view of the above discussion.

Process

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Figure 6:
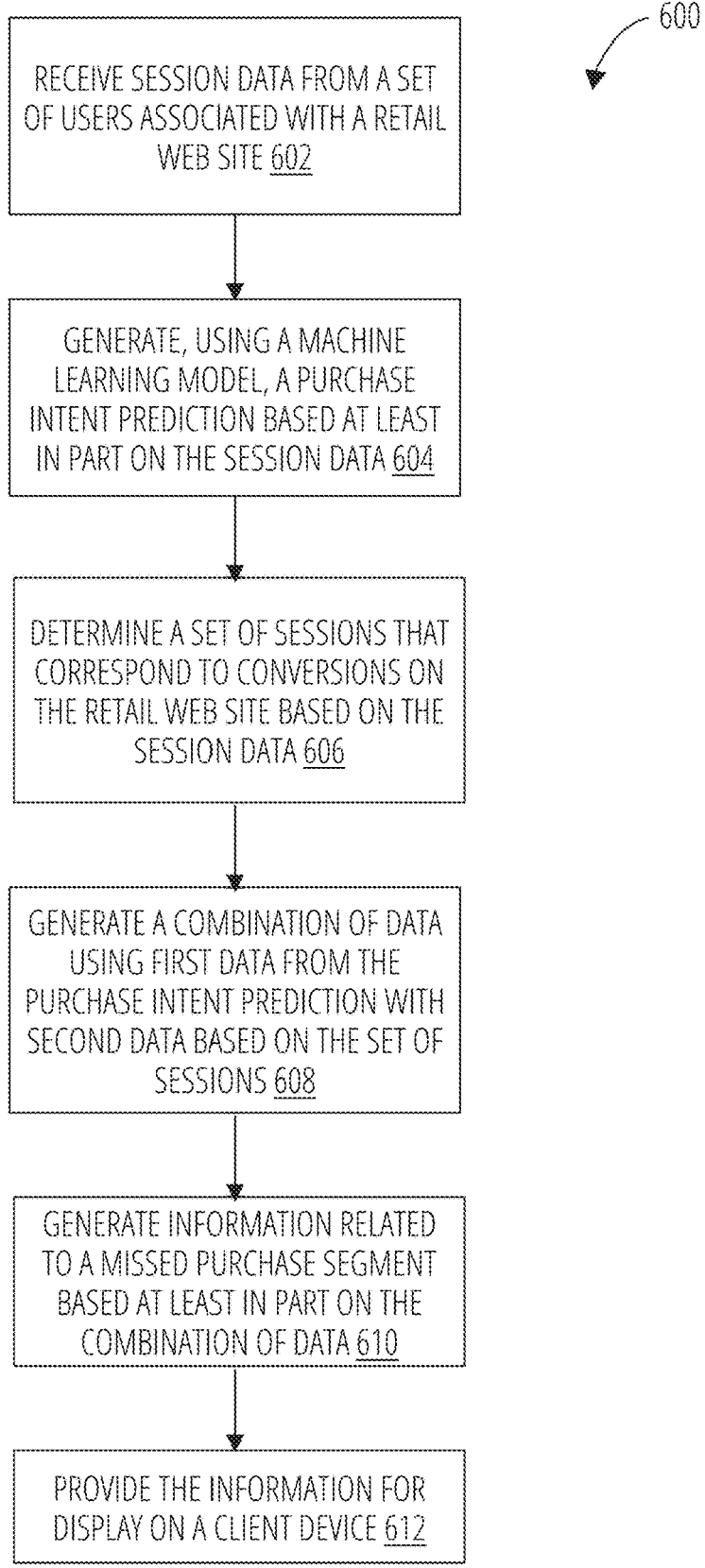
FIG. 6 is a flow diagram illustrating operations of the experience analytics system in performing a process, in accordance with some embodiments of the present disclosure.

FIG. 6 is a flow diagram illustrating operations of the experience analytics system in performing a process 600, in accordance with some embodiments of the present disclosure.

In block 602, the insights system 216 receives session data from a set of users associated with a retail website. In an embodiment, the set of users are anonymous users (e.g., where personally identifiable information is not utilized or associated with such users) and the retail website is a website offering a set of products for purchase through a set of actions performed by a user (e.g., checkout process). In an example, the session data can include information or data for a particular set of sessions in an example (e.g., as discussed before in FIG. 5 above).

In block 604, the insights system 216 generates, using at least one machine learning model, a purchase intent prediction based at least in part on the session data. Insights system 216, in an implementation, generates the purchase intent prediction by determining, using a classifier, a classification for each session from the particular set of sessions, the classification indicating whether each session has ended in a conversion or has ended with no conversion. In an example, each conversion from the set of conversions corresponds to a particular session that includes a purchase from a user at the retail website.

Moreover, insights system 216 assigns a first set of sessions from the particular set of sessions to a first group corresponding to sessions that have ended in conversions, assigns a second set of sessions from the particular set of sessions to a second group corresponding to sessions that have not ended in conversions, and generates, for each session from the second set of sessions, an output value indicating a probability of a purchase occurring in each session.

Moreover, in an example, the classification is based at least in part on a set of features associated with each session, the set of features comprising user agent information, session information, page information, and interaction information (e.g., as discussed in FIG. 5).

In an embodiment, the output value can be a value with a range of zero to one, where the value of zero indicates that a corresponding session will not end in a conversion, and the value of one indicates that the corresponding session is highly likely to end in the conversion. Values between zero and one indicate an increasing probability (as the values increase in ascending order) that the corresponding session is likely ending in a conversion.

In an embodiment, insights system 216 identifies, based at least in part on the output value of each session from the second set of sessions, a second particular set of sessions from the second set of sessions with a segment corresponding to a second set of users with no intention to purchase. In an example, the second particular set of users are different from the set of users with an intention to purchase.

As also discussed before, insights system 216 can utilize a 1-class classification model for determining a purchase intent prediction. In an embodiment, insights system 216 generates the purchase intent prediction by initially determining, using a training set of data, a first set of sessions that correspond to sessions that ended in conversions, the training set of data comprising different session data from a different set of users associated with the retail website. Insights systems 216 then trains, based on unsupervised learning, a classifier using the first set of sessions that correspond to sessions that ended in conversions, and trains a particular model based on the training of the classifier, the particular model modeling a distribution of the first set of sessions that ended in conversions. Insights system 216 then generates, using the trained particular model, for each session from the particular set of sessions, an output value indicating a probability of each session belonging to the first set of sessions that ended in conversions.

In an implementation, as mentioned before, the 1-class classification model assumes that for all sessions that end in conversion, the user has the intention to purchase. When training a model to learn the distribution of sessions that have ended with a conversion, this model will consider non-converted sessions closer to the converted distribution if there was a purchase intention.

In block 606, the insights system 216 determines a set of sessions that correspond to conversions on the retail website based on the session data. As discussed above, this set of sessions can be determined using the techniques discussed above in connection with the 1-class classification model.

In block 608, the insights system 216 generates a combination of data using first data from the purchase intent prediction with second data based on the set of sessions. In an example, such a combination of data can be represented as discussed before in FIG. 4.

In block 610, the insights system 216 generates information related to a missed purchase segment based at least in part on the combination of data. As discussed above, this missed purchase segment can be determined using the techniques discussed above in connection with the 1-class classification model.

In block 612, the insights system 216 provides the information for display on a client device (e.g., the experience analytics client 104). In an example, the information can be a representation of the information discussed above in FIG. 4 and include various graphical or visual elements that are displayed to a viewing user of the experience analytics client 104.

In some embodiments, to facilitate an improvement in the functionality of a computer (e.g., experience analytics system 100, experience analytics client 104, or customer client device 106), insights system 216 can provide mechanisms for resolving errors or malfunctioning components experienced by a given retail website. In an implementation, such mechanisms can include alerts or notifications that are provided to facilitate review of errors that may occur on the retail website. In particular, a subset of users from the missed purchase segment may not complete their session with a conversion due to an error(s) that occurs within a particular web page or portion of the retail website (e.g., malfunctioning button or form, buggy scripting code, and the like). Thus, in some implementations, insights systems 216 can analyze a particular set of sessions included in the missed purchase segment. Insights system 216 then identifies, based at least in part on previous session data associated with the particular set of sessions, at least one web page associated with an event that indicates an error that occurred during a previous session. Insights system 216 provides information corresponding to at least one web page where such information can include a notification or message indicating an error that occurred on the web page. In an implementation, insights system 216 can perform, using the provided information, a set of operations to resolve the error that occurred during the previous session. For example, if the error corresponds to an erroneous form or other element in the web page, insights system 216 can instead send a command(s) to a host of the retail website (e.g., third-party server 108) to provide an alternative web page (or web element) to present to a user. In another example, the set of operations include sending a notification or message to a system administrator of the retail website to enable resolution of the error. In this manner, it is contemplated that insights system 216 can enable various automated operations or error handling when working in conjunction with the host of the retail website.

Machine Architecture

Figure 7:
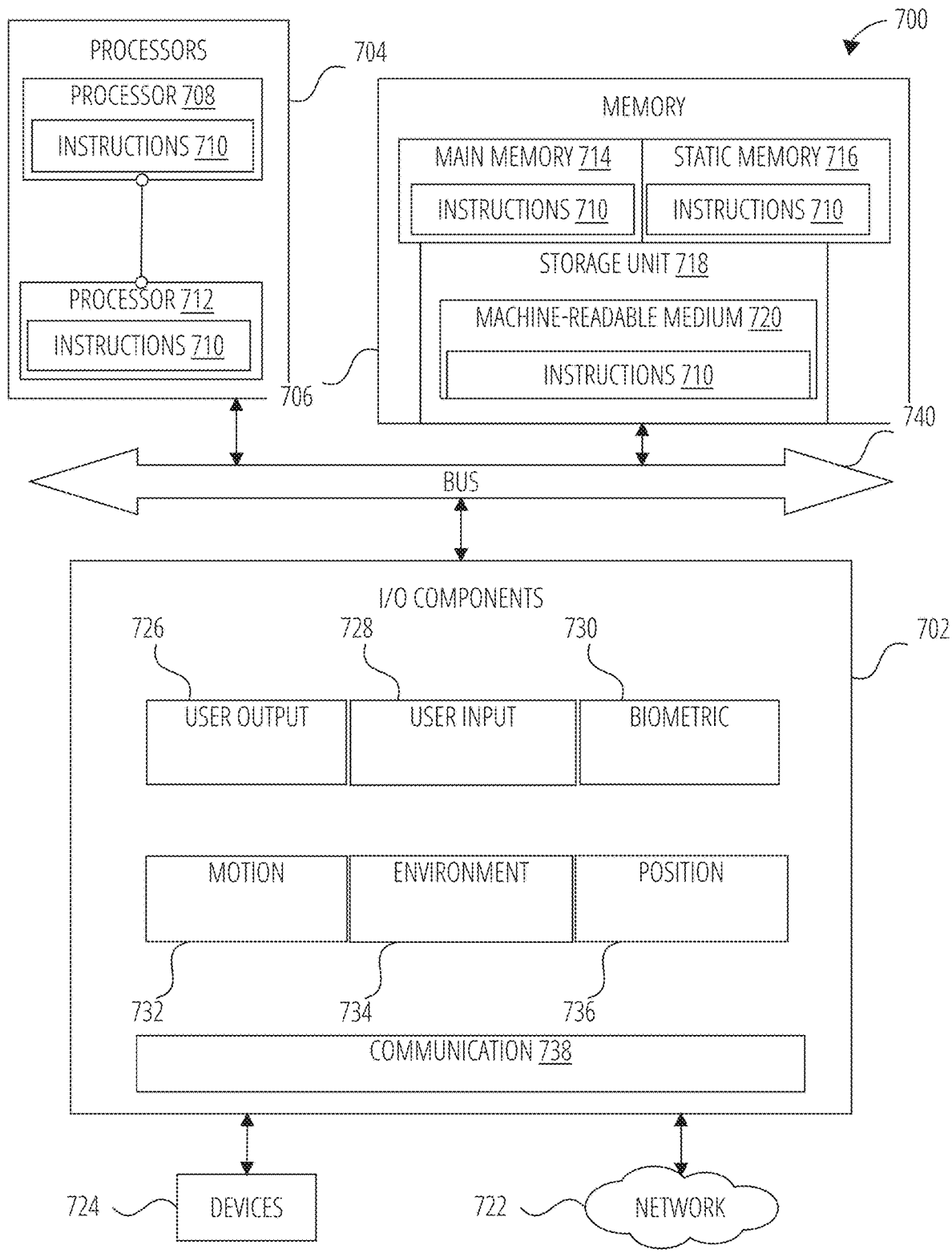
FIG. 7 is a diagrammatic representation of a machine in the form of a computer system within which a set of instructions may be executed for causing the machine to perform any one or more of the methodologies discussed herein, in accordance with some examples.

FIG. 7 is a diagrammatic representation of the machine 700 within which instructions 710 (e.g., software, a program, an application, an applet, an application, or other executable code) for causing the machine 700 to perform any one or more of the methodologies discussed herein may be executed. For example, the instructions 710 may cause the machine 700 to execute any one or more of the methods described herein. The instructions 710 transform the general, non-programmed machine 700 into a particular machine 700 programmed to carry out the described and illustrated functions in the manner described. The machine 700 may operate as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 710, sequentially or otherwise, that specify actions to be taken by the machine 700. Further, while only a single machine 700 is illustrated, the term "machine" shall also be taken to include a collection of machines that individually or jointly execute the instructions 710 to perform any one or more of the methodologies discussed herein. The machine 700, for example, may comprise the member client device 102 or any one of a number of server devices forming part of the experience analytics server 116. In some examples, the machine 700 may also comprise both client and server systems, with certain operations of a particular method or algorithm being performed on the server-side and with certain operations of the particular method or algorithm being performed on the client-side.

The machine 700 may include processors 704, memory 706, and input/output I/O components 702, which may be configured to communicate with each other via a bus 740. In an example, the processors 704 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 708 and a processor 712 that execute the instructions 710. The term "processor" is intended to include multi-core processors that may comprise two or more independent processors (sometimes referred to as "cores") that may execute instructions contemporaneously. Although FIG. 7 shows multiple processors 704, the machine 700 may include a single processor with a single-core, a single processor with multiple cores (e.g., a multi-core processor), multiple processors with a single core, multiple processors with multiples cores, or any combination thereof.

The memory 706 includes a main memory 714, a static memory 716, and a storage unit 718, both accessible to the processors 704 via the bus 740. The main memory 706, the static memory 716, and storage unit 718 store the instructions 710 embodying any one or more of the methodologies or functions described herein. The instructions 710 may also reside, completely or partially, within the main memory 714, within the static memory 716, within machine-readable medium 720 within the storage unit 718, within at least one of the processors 704 (e.g., within the processor's cache memory), or any suitable combination thereof, during execution thereof by the machine 700.

The I/O components 702 may include a wide variety of components to receive input, provide output, produce output, transmit information, exchange information, capture measurements, and so on. The specific U/O components 702 that are included in a particular machine will depend on the type of machine. For example, portable machines such as mobile phones may include a touch input device or other such input mechanisms, while a headless server machine will likely not include such a touch input device. It will be appreciated that the I/O components 702 may include many other components that are not shown in FIG. 7. In various examples, the I/O components 702 may include user output components 726 and user input components 728. The user output components 726 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 728 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 702 may include biometric components 730, motion components 732, environmental components 734, or position components 736, among a wide array of other components. For example, the biometric components 730 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 732 include acceleration sensor components (e.g., accelerometer), gravitation sensor components, rotation sensor components (e.g., gyroscope).

The environmental components 734 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the member client device 102 may have a camera system comprising, for example, front cameras on a front surface of the member client device 102 and rear cameras on a rear surface of the member client device 102. The front cameras may, for example, be used to capture still images and video of a user of the member client device 102 (e.g., "selfies"). The rear cameras may, for example, be used to capture still images and videos in a more traditional camera mode. In addition to front and rear cameras, the member client device 102 may also include a 360° camera for capturing 360° photographs and videos.

Further, the camera system of a member client device 102 may include dual rear cameras (e.g., a primary camera as well as a depth-sensing camera), or even triple, quad or penta rear camera configurations on the front and rear sides of the member client device 102. These multiple cameras systems may include a wide camera, an ultra-wide camera, a telephoto camera, a macro camera and a depth sensor, for example.

The position components 736 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 702 further include communication components 738 operable to couple the machine 700 to a network 722 or devices 724 via respective coupling or connections. For example, the communication components 738 may include a network interface component or another suitable device to interface with the network 722. In further examples, the communication components 738 may include wired communication components, wireless communication components, cellular communication components, Near Field Communication (NFC) components, Bluetooth® components (e.g., Bluetooth®& Low Energy), Wi-Fi® components, and other communication components to provide communication via other modalities. The devices 724 may be another machine or any of a wide variety of peripheral devices (e.g., a peripheral device coupled via a USB).

Moreover, the communication components 738 may detect identifiers or include components operable to detect identifiers. For example, the communication components 738 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 738, such as location via Internet Protocol (IP) geolocation, location via Wi-Fi® signal triangulation, location via detecting an NFC beacon signal that may indicate a particular location, and so forth.

The various memories (e.g., main memory 714, static memory 716, and memory of the processors 704) and storage unit 718 may store one or more sets of instructions and data structures (e.g., software) embodying or used by any one or more of the methodologies or functions described herein. These instructions (e.g., the instructions 710), when executed by processors 704, cause various operations to implement the disclosed examples.

The instructions 710 may be transmitted or received over the network 722, using a transmission medium, via a network interface device (e.g., a network interface component included in the communication components 738) and using any one of several well-known transfer protocols (e.g., hypertext transfer protocol (HTTP)). Similarly, the instructions 710 may be transmitted or received using a transmission medium via a coupling (e.g., a peer-to-peer coupling) to the devices 724.

Software Architecture

Figure 8:
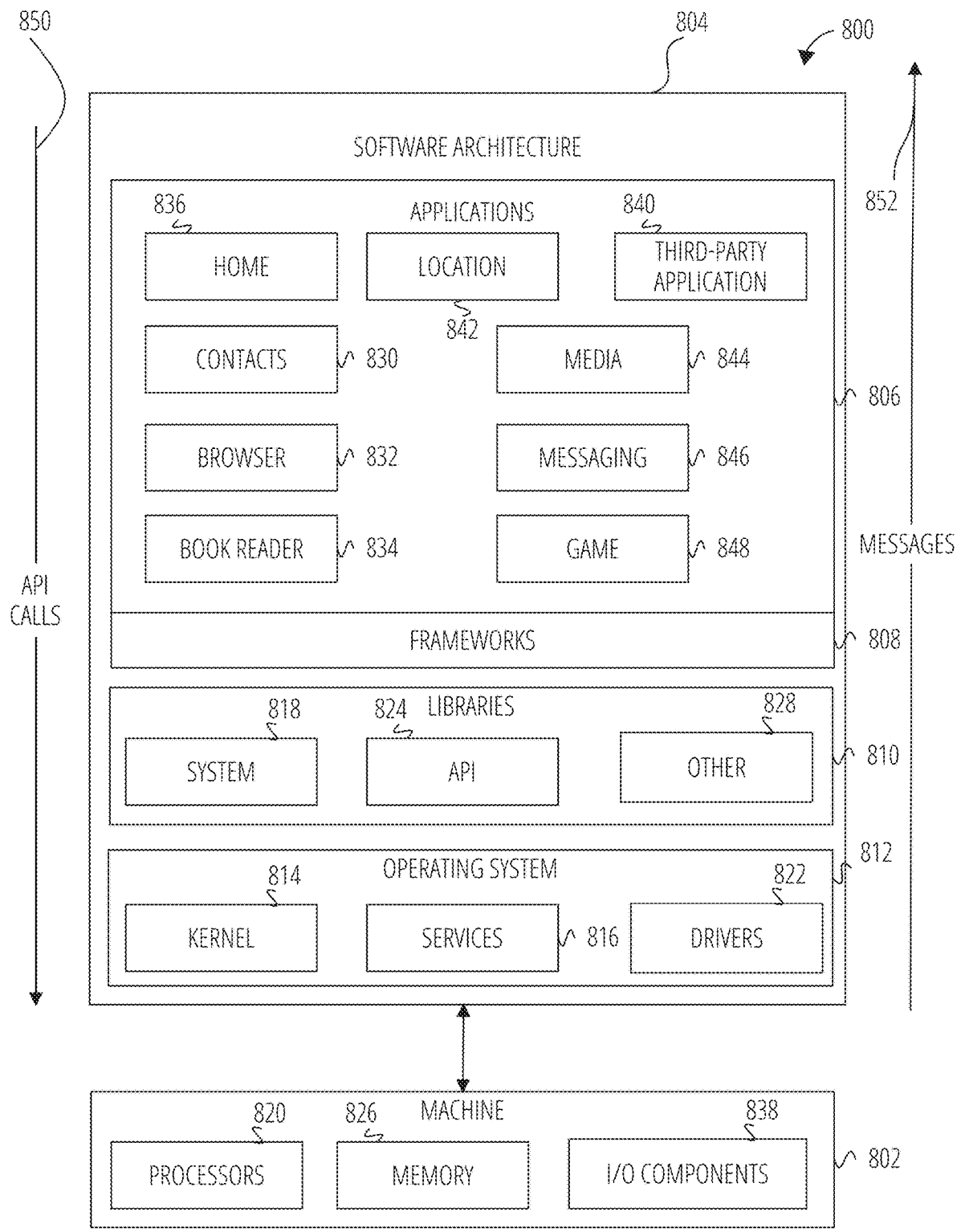
FIG. 8 is a block diagram showing a software architecture within which examples may be implemented.

FIG. 8 is a block diagram 800 illustrating a software architecture 804, which can be installed on any one or more of the devices described herein. The software architecture 804 is supported by hardware such as a machine 802 that includes processors 820, memory 826, and I/O components 838. In this example, the software architecture 804 can be conceptualized as a stack of layers, where each layer provides a particular functionality. The software architecture 804 includes layers such as an operating system 812, libraries 810, frameworks 808, and applications 806. Operationally, the applications 806 invoke API calls 850 through the software stack and receive messages 852 in response to the API calls 850.

The operating system 812 manages hardware resources and provides common services. The operating system 812 includes, for example, a kernel 814, services 816, and drivers 822. The kernel 814 acts as an abstraction layer between the hardware and the other software layers. For example, the kernel 814 provides memory management, processor management (e.g., scheduling), component management, networking, and security settings, among other functionality. The services 816 can provide other common services for the other software layers. The drivers 822 are responsible for controlling or interfacing with the underlying hardware. For instance, the drivers 822 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 810 provide a common low-level infrastructure used by the applications 806. The libraries 810 can include system libraries 818 (e.g., C standard library) that provide functions such as memory allocation functions, string manipulation functions, mathematic functions, and the like. In addition, the libraries 810 can include API libraries 824 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 810 can also include a wide variety of other libraries 828 to provide many other APIs to the applications 806.

The frameworks 808 provide a common high-level infrastructure that is used by the applications 806. For example, the frameworks 808 provide various graphical user interface (GUI) functions, high-level resource management, and high-level location services. The frameworks 808 can provide a broad spectrum of other APIs that can be used by the applications 806, some of which may be specific to a particular operating system or platform.

In an example, the applications 806 may include a home application 836, a contacts application 830, a browser application 832, a book reader application 834, a location application 842, a media application 844, a messaging application 846, a game application 848, and a broad assortment of other applications such as a third-party application 840. The applications 806 are programs that execute functions defined in the programs. Various programming languages can be employed to create one or more of the applications 806, structured in a variety of manners, such as object-oriented programming languages (e.g., Objective-C, Java, or C++) or procedural programming languages (e.g., C or assembly language). In a specific example, the third-party application 840 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 840 can invoke the API calls 850 provided by the operating system 812 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method, comprising:
    receiving session data from a set of users associated with a retail website, the set of users comprising anonymous users and the retail website comprising a website offering a set of products for purchase through a set of actions performed by a user;
    generating, using at least one machine learning model, a purchase intent prediction based at least in part on the session data, generating the purchase intent prediction comprises:
    determining, using a training set of data, a first set of sessions that correspond to sessions that ended in conversions, the training set of data comprising different session data from a different set of users associated with the retail website;
    training, based on unsupervised learning, a classifier using the first set of sessions that correspond to sessions that ended in conversions;
    training a particular model based on the training of the classifier, the particular model modeling a distribution of the first set of sessions that ended in conversions, the particular model comprising a 1-class classification model, wherein an output of the 1-class classification model comprises a probability that a particular session belongs to a segment of sessions that ended in conversions;
    determining, using the 1-class classification model, that a particular set of sessions has a particular probability of belonging to the segment of sessions that ended in conversions;
    determining that the particular set of sessions did not end with conversions;
    based on the particular probability and determining that the particular set of sessions did not end with conversions, generating first data indicating that the particular set of sessions have been assigned to a missed purchase segment;
    determining a set of sessions that correspond to conversions on the retail website based on the session data, the set of sessions being different from the particular set of sessions that did not end with conversions;
    generating a combination of data using the first data from the purchase intent prediction with second data based on the set of the sessions that correspond to a set of conversions, the combination of data comprising a purchase intent segment and the missed purchase segment, the missed purchase segment comprising a subset of users from the purchase intent segment, the purchase intent segment comprising a subset of a set of non-buyers and a set of buyers;

generating information related to the missed purchase segment and the purchase intent segment based at least in part on the combination of data, the missed purchase segment comprising a group of users that intended to purchase one or multiple items or products but did not complete a purchase prior to an end of a corresponding session, the purchase intent segment including a second group of users that includes the set of buyers and a third group of users that includes the subset of the set of non-buyers; and providing the information as a set of graphical elements for display on a client device, the set of graphical elements including a first graphical element as the missed purchase segment, and a second graphical element as the purchase intent segment.

2. The method of claim 1, wherein the session data is associated with a particular set of sessions, and generating the purchase intent prediction comprises:

determining, using the classifier, a classification for each session from the particular set of sessions, the classification indicating whether each session has ended in a conversion or has ended with no conversion;

assigning a first set of sessions from the particular set of sessions to a first group corresponding to sessions that have ended in conversions;

assigning a second set of sessions from the particular set of sessions to a second group corresponding to sessions that have not ended in conversions; and generating, for each session from the second set of sessions, an output value indicating a probability of a purchase occurring in each session.

3. The method of claim 2, wherein to determine the classification is based at least in part on a set of features associated with each session, the set of features comprising user agent information, session information, page information, and interaction information.

4. The method of claim 2, wherein the output value comprises a value with a range of zero to one, the value of zero indicates that a corresponding session will not end in a conversion, and the value of one indicates that the corresponding session is highly likely to end in the conversion.

5. The method of claim 2, further comprising:

identifying, based at least in part on the output value of each session from the second set of sessions, a first particular set of sessions from the second set of sessions that correspond to a set of users with an intention to purchase.

6. The method of claim 5, further comprising:

identifying, based at least in part on the output value of each session from the second set of sessions, a second particular set of sessions from the second set of sessions with a segment corresponding to a second set of users with no intention to purchase, the second particular set of users being different than the set of users with an intention to purchase.

7. The method of claim 1, wherein the session data is associated with a particular set of sessions, and generating the purchase intent prediction further comprises:

generating, using the trained particular model, for each session from the particular set of sessions, an output value indicating a probability of each session belonging to the distribution of the first set of sessions that ended in conversions.

8. The method of claim 7, further comprising:

determining a second set of sessions from the particular set of sessions to a group corresponding to sessions that have not ended in conversions;

identifying, based at least in part on the output value of each session from the second set of sessions, a first particular set of sessions from the second set of sessions that correspond to a particular output value, generated by the trained particular model, greater than a threshold value; and assigning the first particular set of sessions to the missed purchase segment.

9. The method of claim 1, wherein each conversion from the set of conversions corresponds to a particular session that includes a purchase from a user at the retail website.

10. The method of claim 1, further comprising:

analyzing a particular set of sessions included in the missed purchase segment;

identifying, based at least in part on previous session data associated with the particular set of sessions, at least one web page associated with an event that indicates an error that occurred during a previous session;

providing information corresponding to the at least one web page; and performing, using the provided information, a set of operations to resolve the error that occurred during the previous session.

11. A system comprising:

at least one hardware processor; and a memory storing instructions that cause the at least one hardware processor to perform operations comprising:

receiving session data from a set of users associated with a retail website, the set of users comprising anonymous users and the retail website comprising a website offering a set of products for purchase through a set of actions performed by a user;

generating, using at least one machine learning model, a purchase intent prediction based at least in part on the session data, generating the purchase intent prediction comprises:

determining, using a training set of data, a first set of sessions that correspond to sessions that ended in conversions, the training set of data comprising different session data from a different set of users associated with the retail website;

training, based on unsupervised learning, a classifier using the first set of sessions that correspond to sessions that ended in conversions;

training a particular model based on the training of the classifier, the particular model modeling a distribution of the first set of sessions that ended in conversions, the particular model comprising a 1-class classification model, wherein an output of the 1-class classification model comprises a probability that a particular session belongs to a segment of sessions that ended in conversions;

determining, using the 1-class classification model, that a particular set of sessions has a particular probability of belonging to the segment of sessions that ended in conversions;

determining that the particular set of sessions did not end with conversions;

based on the particular probability and determining that the particular set of sessions did not end with conversions, generating first data indicating that the particular set of sessions have been assigned to a missed purchase segment;

determining a set of sessions that correspond to conversions on the retail website based on the session data, the set of sessions being different from the particular set of sessions that did not end with conversions;

generating a combination of data using the first data from the purchase intent prediction with second data based on the set of sessions that correspond to a set of conversions, the combination of data comprising a purchase intent segment and the missed purchase segment, the missed purchase segment comprising a subset of users from the purchase intent segment, the purchase intent segment comprising a subset of a set of non-buyers and a set of buyers;

generating information related to the missed purchase segment and the purchase intent segment based at least in part on the combination of data, the missed purchase segment comprising a group of users that intended to purchase one or multiple items or products but did not complete a purchase prior to an end of a corresponding session, the purchase intent segment including a second group of users that includes the set of buyers and a third group of users that includes the subset of the set of non-buyers; and providing the information as a set of graphical elements for display on a client device, the set of graphical elements including a first graphical element as the missed purchase segment, and a second graphical element as the purchase intent segment.

12. The system of claim 11, wherein the session data is associated with a particular set of sessions, and generating the purchase intent prediction comprises:

determining, using the classifier, a classification for each session from the particular set of sessions, the classification indicating whether each session has ended in a conversion or has ended with no conversion;

assigning a first set of sessions from the particular set of sessions to a first group corresponding to sessions that have ended in conversions;

assigning a second set of sessions from the particular set of sessions to a second group corresponding to sessions that have not ended in conversions; and generating, for each session from the second set of sessions, an output value indicating a probability of a purchase occurring in each session.

13. The system of claim 12, wherein to determine the classification is based at least in part on a set of features associated with each session, the set of features comprising user agent information, session information, page information, and interaction information.

14. The system of claim 12, wherein the output value comprises a value with a range of zero to one, the value of zero indicates that a corresponding session will not end in a conversion, and the value of one indicates that the corresponding session is highly likely to end in the conversion.

15. The system of claim 12, wherein the operations further comprise:

identifying, based at least in part on the output value of each session from the second set of sessions, a first particular set of sessions from the second set of sessions that correspond to a set of users with an intention to purchase.

16. The system of claim 15, wherein the operations further comprise:

identifying, based at least in part on the output value of each session from the second set of sessions, a second particular set of sessions from the second set of sessions with a segment corresponding to a second set of users with no intention to purchase, the second particular set of users being different than the set of users with an intention to purchase.

17. The system of claim 11, wherein the session data is associated with a particular set of sessions, and generating the purchase intent prediction further comprises:

generating, using the trained particular model, for each session from the particular set of sessions, an output value indicating a probability of each session belonging to the distribution of the first set of sessions that ended in conversions.

18. The system of claim 17, wherein the operations further comprise:

determining a second set of sessions from the particular set of sessions to a group corresponding to sessions that have not ended in conversions;

identifying, based at least in part on the output value of each session from the second set of sessions, a first particular set of sessions from the second set of sessions that correspond to a particular output value, generated by the trained particular model, greater than a threshold value; and assigning the first particular set of sessions to the missed purchase segment.

19. The system of claim 11, wherein each conversion from the set of conversions corresponds to a particular session that includes a purchase from a user at the retail website.

20. The system of claim 11, wherein the operations further comprise:

analyzing a particular set of sessions included in the missed purchase segment;

identifying, based at least in part on previous session data associated with the particular set of sessions, at least one web page associated with an event that indicates an error that occurred during a previous session;

providing information corresponding to the at least one web page; and performing, using the provided information, a set of operations to resolve the error that occurred during the previous session.

21. A non-transitory computer-storage medium comprising instructions that, when executed by one or more processors of a machine, configure the machine to perform operations comprising:

receiving session data from a set of users associated with a retail website, the set of users comprising anonymous users and the retail website comprising a website offering a set of products for purchase through a set of actions performed by a user;

generating, using at least one machine learning model, a purchase intent prediction based at least in part on the session data, generating the purchase intent prediction comprises:

determining, using a training set of data, a first set of sessions that correspond to sessions that ended in conversions, the training set of data comprising different session data from a different set of users associated with the retail website;

training, based on unsupervised learning, a classifier using the first set of sessions that correspond to sessions that ended in conversions;

training a particular model based on the training of the classifier, the particular model modeling a distribution of the first set of sessions that ended in conversions, the particular model comprising a 1-class classification model, wherein an output of the 1-class classification model comprises a probability that a particular session belongs to a segment of sessions that ended in conversions;

determining, using the 1-class classification model, that a particular set of sessions has a particular probability of belonging to the segment of sessions that ended in conversions;

determining that the particular set of sessions did not end with conversions;

based on the particular probability and determining that the particular set of sessions did not end with conversions, generating first data indicating that the particular set of sessions have been assigned to a missed purchase segment;

determining a set of sessions that correspond to conversions on the retail website based on the session data, the set of sessions being different from the particular set of sessions that did not end with conversions;

generating a combination of data using the first data from the purchase intent prediction with second data based on the set of sessions that correspond to a set of conversions, the combination of data comprising a purchase intent segment and the missed purchase segment, the missed purchase segment comprising a subset of users from the purchase intent segment, the purchase intent segment comprising a subset of a set of non-buyers and a set of buyers;

generating information related to the missed purchase segment and the purchase intent segment based at least in part on the combination of data, the purchase intent segment including a second group of users that includes the set of buyers and a third group of users that includes the subset of the set of non-buyers; and providing the information as a set of graphical elements for display on a client device, the set of graphical elements including a first graphical element as the missed purchase segment, and a second graphical element as the purchase intent segment.

22. The non-transitory computer-storage medium of claim 21, wherein the session data is associated with a particular set of sessions, and generating the purchase intent prediction comprises:

determining, using the classifier, a classification for each session from the particular set of sessions, the classification indicating whether each session has ended in a conversion or has ended with no conversion;

assigning a first set of sessions from the particular set of sessions to a first group corresponding to sessions that have ended in conversions;

assigning a second set of sessions from the particular set of sessions to a second group corresponding to sessions that have not ended in conversions; and generating, for each session from the second set of sessions, an output value indicating a probability of a purchase occurring in each session.

23. The non-transitory computer-storage medium of claim 22, wherein to determine the classification is based at least in part on a set of features associated with each session, the set of features comprising user agent information, session information, page information, and interaction information.

24. The non-transitory computer-storage medium of claim 22, wherein the output value comprises a value with a range of zero to one, the value of zero indicates that a corresponding session will not end in a conversion, and the value of one indicates that the corresponding session is highly likely to end in the conversion.

25. The non-transitory computer-storage medium of claim 22, wherein the operations further comprise:

identifying, based at least in part on the output value of each session from the second set of sessions, a first particular set of sessions from the second set of sessions that correspond to a set of users with an intention to purchase.

26. The non-transitory computer-storage medium of claim 25, wherein the operations further comprise:

identifying, based at least in part on the output value of each session from the second set of sessions, a second particular set of sessions from the second set of sessions with a segment corresponding to a second set of users with no intention to purchase, the second particular set of users being different than the set of users with an intention to purchase.

27. The non-transitory computer-storage medium of claim 21, wherein the session data is associated with a particular set of sessions, and generating the purchase intent prediction further comprises:

generating, using the trained particular model, for each session from the particular set of sessions, an output value indicating a probability of each session belonging to the distribution of the first set of sessions that ended in conversions.

28. The non-transitory computer-storage medium of claim 27, wherein the operations further comprise:

determining a second set of sessions from the particular set of sessions to a group corresponding to sessions that have not ended in conversions;

identifying, based at least in part on the output value of each session from the second set of sessions, a first particular set of sessions from the second set of sessions that correspond to a particular output value, generated by the trained particular model, greater than a threshold value; and assigning the first particular set of sessions to the missed purchase segment.

29. The non-transitory computer-storage medium of claim 21, wherein each conversion from the set of conversions corresponds to a particular session that includes a purchase from a user at the retail website.

30. The non-transitory computer-storage medium of claim 21, wherein the operations further comprise:

analyzing a particular set of sessions included in the missed purchase segment;

identifying, based at least in part on previous session data associated with the particular set of sessions, at least one web page associated with an event that indicates an error that occurred during a previous session;

providing information corresponding to the at least one web page; and performing, using the provided information, a set of operations to resolve the error that occurred during the previous session.

* * * * *

UNITED STATES PATENT AND TRADEMARK OFFICE
CERTIFICATE OF CORRECTION

| | |
|---|---|
| PATENT NO. | : 11,869,047 B2 |
| APPLICATION NO. | : 17/733088 |
| DATED | : January 9, 2024 |
| INVENTOR(S) | : Dayan et al. |

It is certified that error appears in the above-identified patent and that said Letters Patent is hereby corrected as shown below:

In the Specification

In Column 13, Line 24, delete "I/O" and insert --(I/O)-- therefor

In Column 13, Line 46, delete "706," and insert --714,-- therefor

In Column 13, Line 59, delete "U/O" and insert --I/O-- therefor

In Column 15, Line 17, delete "Bluetooth®&" and insert --Bluetooth®-- therefor

Signed and Sealed this
Third Day of December, 2024

Katherine Kelly Vidal
*Director of the United States Patent and Trademark Office*